United States Patent
Csutak et al.

(10) Patent No.: US 9,568,640 B2
(45) Date of Patent: Feb. 14, 2017

(54) DISPLACEMENT MEASUREMENTS USING SIMULATED MULTI-WAVELENGTH LIGHT SOURCES

(71) Applicants: Sebastian Csutak, Houston, TX (US); Carl M. Edwards, Katy, TX (US)

(72) Inventors: Sebastian Csutak, Houston, TX (US); Carl M. Edwards, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 159 days.

(21) Appl. No.: 14/486,018

(22) Filed: Sep. 15, 2014

(65) Prior Publication Data
US 2016/0077235 A1    Mar. 17, 2016

(51) Int. Cl.
*G01B 9/02* (2006.01)
*G01L 1/24* (2006.01)
(Continued)

(52) U.S. Cl.
CPC .............. *G01V 7/00* (2013.01); *G01V 1/162* (2013.01); *G01V 8/12* (2013.01)

(58) Field of Classification Search
CPC . G01B 9/02007; G01B 2290/25; E21B 47/06; E21B 47/065; E21B 47/123; G01V 7/02; G01V 8/00; G01V 8/10; G01V 8/12; G01V 8/14; G01V 8/16; G01V 8/20; G01V 8/22
See application file for complete search history.

(56) References Cited

U.S. PATENT DOCUMENTS 6,163,555 A    12/2000    Siddiqui et al.
6,356,350 B1    3/2002    Silver et al.
(Continued)

FOREIGN PATENT DOCUMENTS

| WO | 0122542 A2 | 3/2001 |
| WO | 2013166407 A1 | 11/2013 |
| WO | 2014099924 A1 | 6/2014 |

OTHER PUBLICATIONS

Coldren, et al.; "Tunable Semiconductor Lasers: A Tutorial"; Journal of Llghtwave Technology, vol. 22, No. 1; Jan. 2004; 10 pages.
(Continued)

*Primary Examiner* — Michael A Lyons
(74) *Attorney, Agent, or Firm* — Cantor Colburn LLP

(57) ABSTRACT

An embodiment of an apparatus for estimating a parameter includes a multi-wavelength electromagnetic source configured to emit electromagnetic radiation beams having multiple wavelengths at a fixed angle relative to an interferometer, the multi-wavelength source having a stabilizer configured to lock each beam to one of a plurality of discrete wavelength ranges. The apparatus also includes the interferometer, which has a fixed reference reflector and a moveable reflecting assembly coupled to a moveable mass, the mass configured to move in response to the parameter. The apparatus further includes a detector configured to detect an interference pattern generated by the interferometer for each beam, and a processor configured to combine the interference patterns and estimate the parameter based on the combined interference pattern.

20 Claims, 6 Drawing Sheets

(51) Int. Cl.
*G01V 7/00* (2006.01)
*G01V 1/16* (2006.01)
*G01V 8/12* (2006.01)

(56) References Cited

U.S. PATENT DOCUMENTS

| | | | |
|---|---|---|---|
| 6,690,873 | B2 | 2/2004 | Bendett et al. |
| 6,788,716 | B2 | 9/2004 | Ahmadvand et al. |
| 6,868,236 | B2 | 3/2005 | Wiltsey et al. |
| 7,035,305 | B2 | 4/2006 | Adams et al. |
| 7,099,586 | B2 | 8/2006 | Yoo |
| 7,242,699 | B2 | 7/2007 | Arimoto |
| 7,457,339 | B2 | 11/2008 | Arimoto et al. |
| 7,466,882 | B2 | 12/2008 | Kish, Jr. et al. |
| 7,885,492 | B2 | 2/2011 | Welch et al. |
| 8,260,150 | B2 | 9/2012 | Mahgerefteh et al. |
| 8,553,327 | B2 | 10/2013 | Chann et al. |
| 8,797,548 | B2 | 8/2014 | Edwards et al. |
| 2003/0081218 | A1 | 5/2003 | Orban |
| 2008/0245960 | A1* | 10/2008 | Csutak ............... G01N 21/3577 250/269.1 |
| 2008/0247430 | A1 | 10/2008 | Zhang et al. |
| 2009/0038794 | A1* | 2/2009 | Yamate ................. E21B 47/123 166/254.2 |
| 2009/0114013 | A1* | 5/2009 | DiFoggio ................ E21B 47/00 73/382 R |
| 2009/0235740 | A1* | 9/2009 | Carr ......................... G01V 7/00 73/382 R |
| 2012/0250017 | A1 | 10/2012 | Morys et al. |
| 2013/0265566 | A1 | 10/2013 | Smith et al. |
| 2013/0308951 | A1 | 11/2013 | Blumenthal et al. |
| 2014/0080729 | A1 | 3/2014 | Grego et al. |
| 2014/0174147 | A1 | 6/2014 | DiFoggio et al. |
| 2014/0327915 | A1* | 11/2014 | Duncan ..................... G01V 8/00 356/477 |
| 2014/0339411 | A1* | 11/2014 | Lagace ..................... G01V 8/00 250/269.1 |
| 2015/0204899 | A1* | 7/2015 | Salit ....................... G01P 15/093 73/514.26 |

OTHER PUBLICATIONS

Han, et al., "Temperature Characteristics of Monolithically Integrated Wavelenght-Selectable Light Sources", Chin. Phys.Lett, vol. 30, No. 10 (2013), pp. 108501-1 to 108501-3.
Kim et al., "Multi-wavelength Interferomtry based on the Frequency Comb of a Femtosecond Laser", CLEO/Pacific Rim 2009, Shanghai, China, Aug. 31-Sep. 3, 2009, 2 pages.
Latzal, "Interferometry Offers Accurate Wavelength Measurements", Features, Dec. 2013, 4 pages. http://www.photonics.com/Article.aspx?AID=55484.
Nehaus, et al., "Diode Laser Locking and Linewidth Narrowing", Diode Laser Control Electronics, Appl-1012, TOPTICA Photonics AG, 8 pages.
Ni, et al., "Packaging and testing of multi-wavelength DFB laser array using REC technology", Optics Communications 312( 2014), pp. 123-126.
Notification of Transmittal of the International Search Report and the Written Opinion of the International Searching Authority, or the Declaration; PCT/US2015/049945; Mail date: Nov. 30, 2015; 13 pages.
Wakaba, et al., "High Power Operation at High Temperature ofAlGaInAs/InP Widely Tunable BH Laser", 2013 18th OptoElectronics and Communications Conference held jointly with 2013 International Conference on Photonics in Switching, 2 pages.
Wilde, et al., "Frequency Noise Characterization of a Widely TunableNarrow-Linewidth DFB Laser Array Source", 2008 Optical Society of America, 3 pages.
Zhang, et al., "Multi-channel DFB lasera rrays fabricated by SAG technology", Optics Communications 300 (2013), pp. 230-235.

* cited by examiner

US 9,568,640 B2

DISPLACEMENT MEASUREMENTS USING SIMULATED MULTI-WAVELENGTH LIGHT SOURCES

BACKGROUND

In exploration for hydrocarbons, knowledge of properties of earth formations is important for being able to locate and characterize reservoirs of oil and gas. Measuring properties of earth formations, such as the location and properties of various structures, allows for the identification of such reservoirs, their potential for hydrocarbon production, and optimization of production techniques.

Gravitational measurement is one technique used for geophysical exploration. Precise gravity surveys allow a measurement of anomalies of the subsurface density introduced by certain geological structure (e.g. salt domes, faults, iron ore deposits, etc.). Gravitational surveying is used for purposes such as oil exploration, mineral exploration and oil and gas reservoir monitoring.

SUMMARY

An embodiment of an apparatus for estimating a parameter includes a multi-wavelength electromagnetic source configured to emit electromagnetic radiation beams having multiple wavelengths at a fixed angle relative to an interferometer, the multi-wavelength source having a stabilizer configured to lock each beam to one of a plurality of discrete wavelength ranges. The apparatus also includes the interferometer, which has a fixed reference reflector and a moveable reflecting assembly coupled to a moveable mass, the mass configured to move in response to the parameter. The apparatus further includes a detector configured to detect an interference pattern generated by the interferometer for each beam, and a processor configured to combine the interference patterns and estimate the parameter based on the combined interference pattern.

An embodiment of a method of estimating a parameter includes emitting a plurality of electromagnetic radiation beams from a multi-wavelength electromagnetic source at a fixed angle relative to an interferometer, each beam having a different wavelength, and stabilizing each beam to a discrete wavelength range. The method also includes directing each beam to the interferometer, the interferometer including a fixed reference reflector and a moveable reflecting assembly coupled to a moveable mass, the mass configured to move in response to the parameter. The method further includes detecting an interference pattern generated by the interferometer for each beam, and combining the interference patterns by a processor and estimating the parameter based on the combined interference pattern.

BRIEF DESCRIPTION OF THE DRAWINGS

The following descriptions should not be considered limiting in any way. With reference to the accompanying drawings, like elements are numbered alike.

DETAILED DESCRIPTION

There are provided systems, apparatuses and methods for measurements using optical interferometers. An embodiment of a displacement sensor includes an interferometer (e.g., a Fabry-Perot interferometer), which may be used to measure properties or parameters such as acceleration and gravitational force. The interferometer includes a fixed reflector and a moveable reflector, such as a partially reflective mirror attached to a moveable mass. A multi-wavelength source is coupled to the interferometer, which may be a monolithic laser assembly. The laser assembly is configured to emit a plurality of beams, each having a different wavelength. Examples of the laser assembly include a distributed feedback laser array and a tunable laser. An embodiment of a method includes emitting multiple beams to the interferometer, either in sequence or simultaneously. Multiple oscillating interferometer signals (e.g., one for each beam) are detected and analyzed to estimate a parameter.

Figure 1:
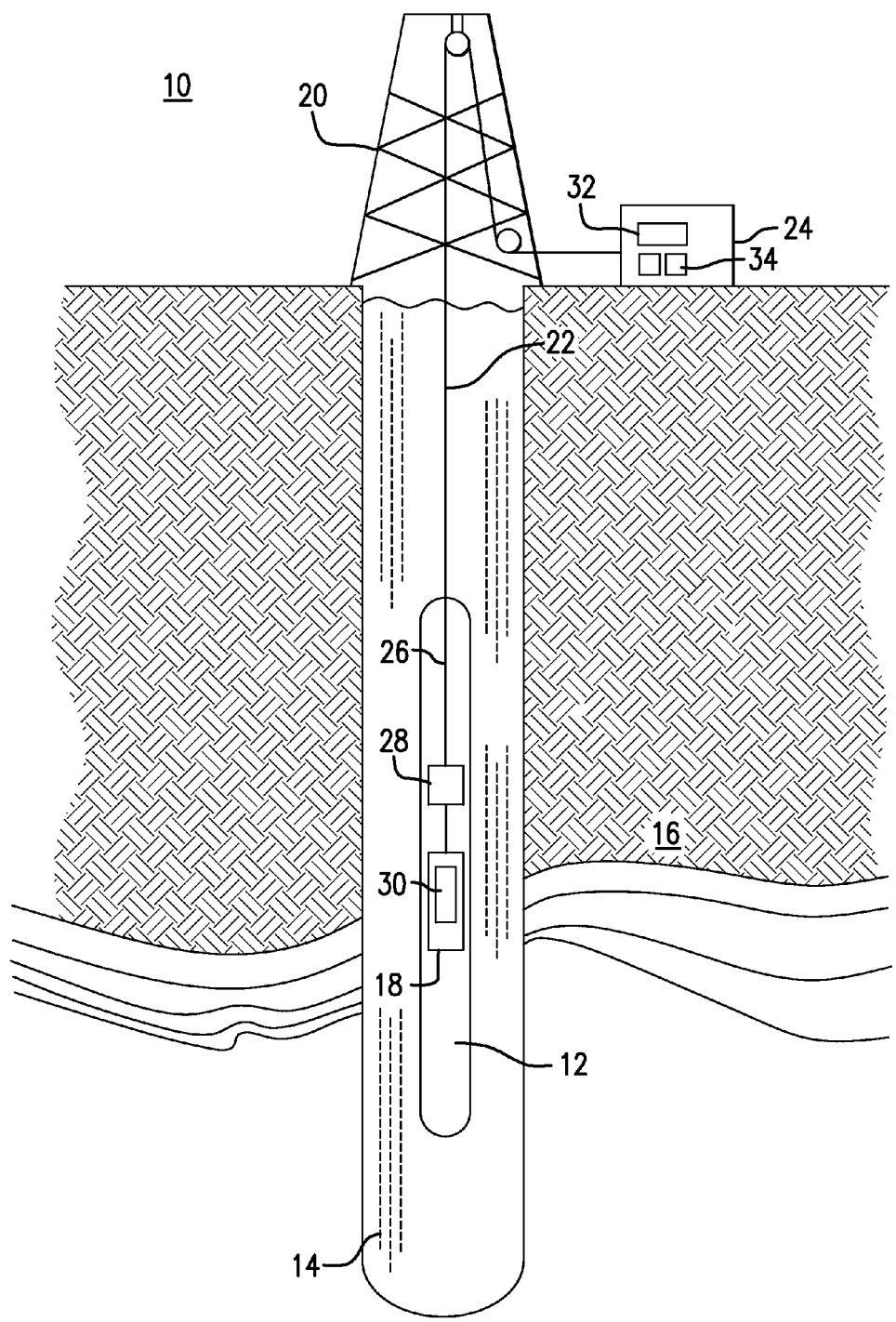
FIG. 1 depicts an exemplary embodiment of a formation measurement system.

Referring to FIG. 1, an exemplary embodiment of a downhole measurement system 10 includes one or more measurement tools 12 disposed in a borehole 14 in an earth formation 16. At least one of the measurement tools 12 includes one or more displacement sensors 18 for measuring one or more parameters. For example, the displacement sensor 18 is configured as an accelerometer or gravimeter for measuring the gravitational field at various locations in the formation. In this embodiment, the displacement sensor 18 is incorporated in a wireline tool 12 connected to a wellhead 20 via a wireline 22. In other embodiments, one or more sensors can be located or arrayed at the surface. Other embodiments for which the sensor 18 can be used include logging-while-drilling, production logging, and borehole, production and/or completion monitoring. The sensor 18 may be incorporated into a moveable carrier, or incorporated into casing, cement or other components for permanent or semi-permanent installation.

The tool 12 and sensor 18 are not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include wirelines, wireline sondes, slickline sondes, drop shots, downhole subs, bottom-hole assemblies, and drill strings.

In one embodiment, the tool 12 and/or other downhole components are equipped with transmission equipment to communicate ultimately to a surface processing unit 24. Such transmission equipment may take any desired form, and different transmission media and methods may be used, such as wired, fiber optic, and wireless transmission methods. For example, the surface processing unit 24 is connected to the tool 12 and/or sensor 18 via a communication line or cable 26, which may include optical fibers and/or electrical conductors. The cable 26 can transmit command and control signals to control the tool and/or gravimeter. The cable 26 may also have other functions, including transmitting data to the surface and providing power to the tool 12 and/or other components.

Additional processing units may be disposed with the carrier. For example, a downhole electronics unit 28 includes various electronic components to facilitate receiving signals and data, transmitting data, and/or processing data downhole. The surface processing unit 24, downhole electronics unit 28, the tool 12 and/or other components of the system 10 include devices as necessary to provide for storing and/or processing data. Exemplary devices include, without limitation, at least one processor, storage, memory, input devices, output devices and the like.

In one embodiment, the displacement sensor 18 includes an optical interferometer assembly 30 coupled to a multi-wavelength light source such as a laser array assembly or a tunable laser. Detectors are configured to receive return signals as interferometric patterns produced by the interferometer assembly 30. The light source may be located at the sensor 18 or other downhole location, or may be located at the surface, e.g., at the surface processing unit 24 or interrogator unit as shown in FIG. 1. In one embodiment, the sensor 18 includes the light source, e.g., is integrated with the light source as a single electronic package. The sensor 18 may be controlled by a processor or processing device such as the surface processing unit 24 and/or downhole electronics unit 28. Likewise, the detectors may be located borehole as part of the gravimeter and/or the interferometer assembly, or may be located at the surface and coupled to the interferometer assembly 30 by optical fibers.

The interferometer assembly is configured as a high resolution and high dynamic range optical displacement sensor, such as a Fabry-Perot (FP), Michelson or Mach-Zehnder interferometers. Optical-displacement sensors operate by detecting light reflected by an optical element that causes a change in the light's optical path length in response to an environmental stimulus, such as changes in gravity, acceleration, pressure differential, sound, vibration and others.

An exemplary optical interferometer is the Fabry-Perot interferometer, which includes a reflector assembly referred to as an etalon. The etalon includes an optically resonant cavity that distributes optical energy of an input light signal into a reflected signal and a transmitted signal. The ratio of optical energy in the reflected and transmitted signals depends on the wavelength of the input signal and on the cavity length of the optically resonant cavity. The cavity length corresponds to the distance between two substantially-parallel, partially reflective surfaces.

In an etalon, light can be strongly modulated by very small changes in the cavity length, and these changes can be detected using standard optical detection approaches that result in a wide dynamic range. An etalon-based displacement sensor having high dynamic range and high sensitivity has many advantages in the field of physical sensing including reduction in size of the optical interferometer transducer.

An etalon may be configured to be sensitive to a force or acceleration stimulus by having one surface of the etalon operably connected to a surface of, or disposed on, a movable element or mass. When the element moves in response to the stimulus, the cavity length changes and, therefore, so does the ratio of optical energy in the reflected and transmitted signals. As a result, an electrical output signal based on one of the reflected and transmitted signals may be a function of the stimulus incident on the etalon.

The sensor 18 may be used for various purposes, including measuring gravity, acceleration, pressure, deformation, seismic or acoustic properties, and any other properties or phenomena that can be measured using optical interferometry. Although the sensor 18 and/or other displacement sensor embodiments are described in conjunction with downhole applications, they are not so limited and can be used for a variety of measurements, including measurements performed at the surface and measurements unrelated to hydrocarbon exploration.

In one embodiment, the interferometer assembly is configured as a high resolution accelerometer/gravimeter capable of measuring gravitational acceleration at a high resolution, e.g., 1 part per billion. Gravitation acceleration is typically measured using the unit "g", which is the acceleration due to gravity at the earth's surface, defined as 9.80665 m/s2.

Using a single optical source, a 1 part-per-billion (ppb) of "g" resolution accelerometer/gravimeter requires that the optical source frequency needs to be known with 0.1 ppb resolution. Typical approaches to optical interferometers have drawbacks that include difficulty in attaining a sufficient dynamic range and resolution. For example, in a Fabry-Perot type accelerometer, the transfer function of the FP interferometer has a nonlinear shape and portions where the FP optical cavity has low sensitivity to input acceleration (sensitivity gaps in the free spectral range), which limits the dynamic range of the accelerometer. To circumvent this limitation, a multi-angle beam solution has been proposed to achieve a dynamic range of about +/−1 g.

Figure 2:
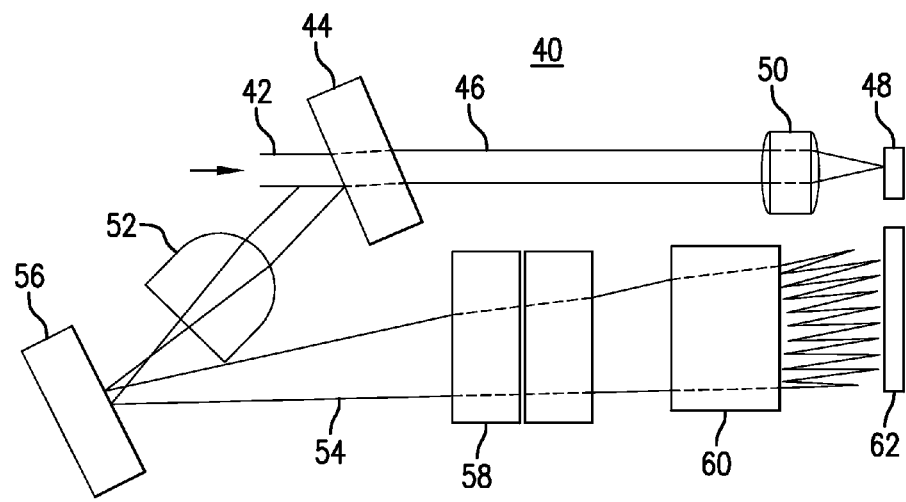
FIG. 2 depicts an example of a displacement sensor including a multi-angle interferometer assembly.

FIG. 2 shows an exemplary interferometer 40 for gravity or other measurements that includes a multi-angle light source. A coherent light beam 42, which may be collimated and/or polarized, is transmitted from a laser source and split by a beam splitter 44 to generate a reference signal 46, which is transmitted to a reference detector 48, and may be focused by, e.g., a lens 50.

A condenser lens 52 spreads the beam 42 into divergent beams 54 in the far field. An input tilt mirror 56 sets the mean angle of incidence through an etalon 58. The mean angle ranges from, e.g., 0 degrees to about $\theta_{max}$ degrees. The tilt mirror 56 is moved through a plurality of angles to cause the light beams 54 to impinge on the etalon 58, each with its own angle of incidence. The light beams 54 are partially transmitted through the etalon 58 and may be collimated by, e.g., a collimator 60 before reaching a detector array 62. The number of angles of the light beams may vary with the finesse of the etalon 58, which is a parameter characterizing an optical cavity and may be a function of the reflectivity of the mirrored surfaces of the etalon 58.

FIGS. 3-10 illustrate aspects of embodiments of an interferometer assembly that incorporates multi-wavelength sources in place of the multi-angle source described above. The assemblies may take any suitable form, such as similar to that of the interferometer 40, but with a multi-wavelength source in place of the multi-angle source. Other exemplary embodiments of suitable detector and interferometer configurations are described below, but are not limited thereto.

In one embodiment, a multi-wavelength source includes an array of single-frequency or single wavelength electromagnetic sources. Each single frequency source is stabilized to different wavelength or wavelength range. In another embodiment, the multi-wavelength source is a tunable laser. The multi-wavelength source mimics the multi-angle solution described above by applying beams with different wavelengths to provide a high resolution calculation of the distance or change in distance between reflectors in an interferometer. This calculation can be used to estimate various parameters, such as acceleration, gravity, pressure, temperature and others based on changes in the length of optical paths followed by the beams. The multi-wavelength source may be configured to emit successive multiple beams, or emit multiple beams simultaneously, with each beam being modulated to facilitate separation of the resulting interferometer signals.

In one embodiment, the multi-wavelength source includes a monolithic frequency stabilized laser assembly. As described herein, "monolithic" refers to an assembly having components (e.g., at least the gain medium and associated optics, and/or components of the interferometer) bonded together or otherwise rigidly attached. For example, the optical source includes phase control components, gain media and front and back mirrors integrated on a single semiconductor chip or other suitable substrate. Such monolithic sources have numerous advantages, including allowing for simpler interferometer designs and smaller assemblies. Furthermore, such sources can provide greater temperature and pressure control due to, e.g., reducing reliance on optical fibers that can be affected by temperature and pressure conditions in downhole or other environments.

Figure 3:
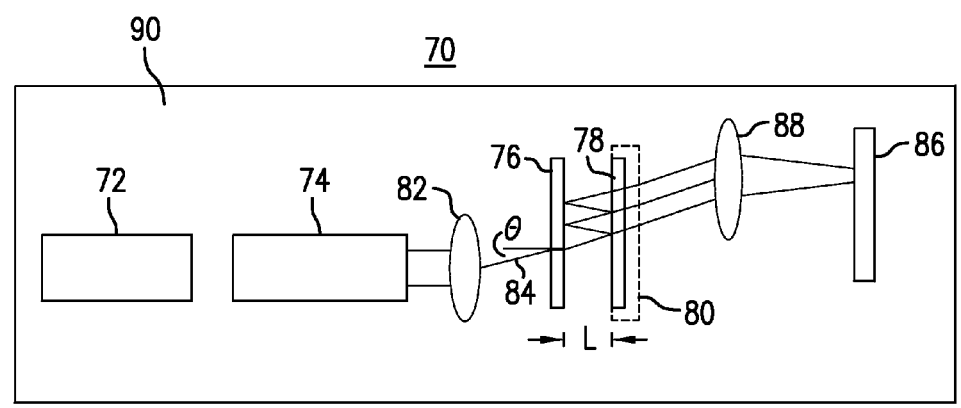
FIG. 3 depicts an exemplary embodiment of a displacement sensor including a multi-wavelength electromagnetic radiation source coupled to an interferometer assembly.

An embodiment of a displacement sensor 70 is shown in FIG. 3. The sensor includes a multi-wavelength optical source 72 coupled to a frequency/wavelength stabilizer 74, such as a gas cell configured to lock the emitted laser beams to a frequency/wavelength range or error. The stabilized beams are transmitted to an interferometer assembly that includes a fixed reflector or mirror 76 and a moveable reflector or mirror 78. The mirror 78 is attached to a moveable body 80, such as a mass coupled to a spring, which is configured to move in response to a parameter such as acceleration, change in the gravitational field, or pressure. The reflectors 76 and 78 form an etalon that defines a cavity having a length L. A lens 82 or other focusing/control optics direct a beam 84 to the etalon at a fixed angle $\theta$, where it is partially reflected and transmitted to a detector array 86 via a lens 88 or other optics. The displacement sensor 70 may be fabricated in a small package 90, such as a semiconductor chip, multi-chip module, and/or MEMS package.

Embodiments of the optical source 72 include a monolithic, frequency stabilized laser source that can be coupled to the interferometer via suitable optics. As the source and interferometer may be coupled together in a small package without moving parts, optical fibers are not necessary. Examples of the optical source include laser array assemblies such as distributed feedback lasers (DFBs), and tunable lasers such as distributed Bragg reflector (DBR) lasers.

Figure 4:
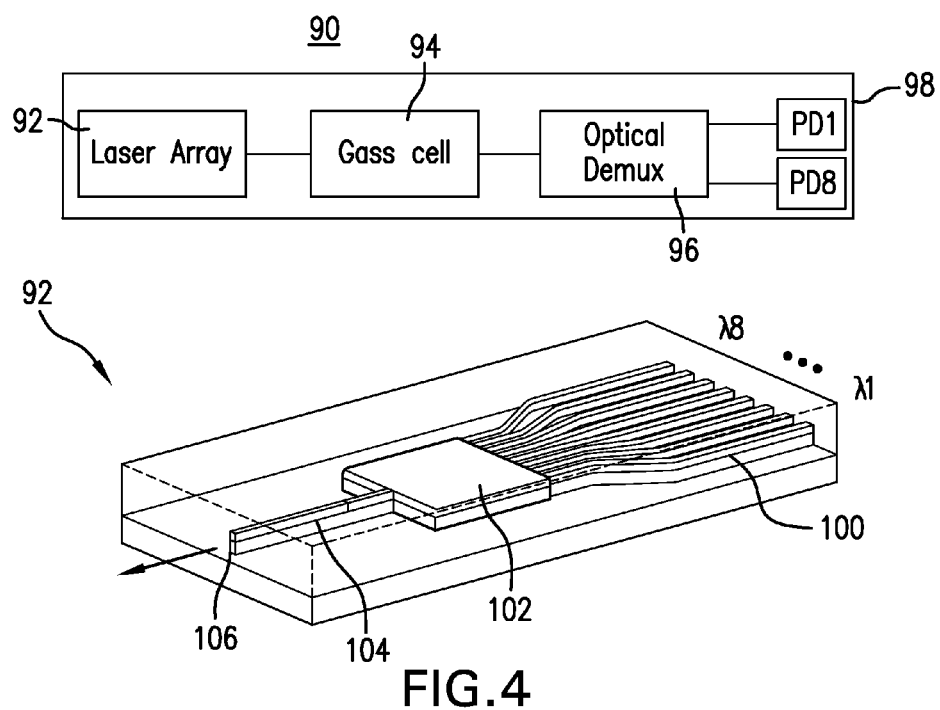
FIG. 4 depicts an exemplary multi-wavelength source including a stabilizing assembly and an array of fixed wavelength laser emitters.

FIG. 4 shows an example of a multi-wavelength source assembly 90 that includes an array of single wavelength sources. The multi-wavelength source includes a monolithic laser array 92, and a frequency stabilizer that includes a gas cell 94, an optical demultiplexer 96, and photodiodes 98 for each individual source. An exemplary configuration of the laser array 92 is also shown in FIG. 4. An array of DFB laser diodes 100 are each coupled to a combiner 102 (e.g., a multimode interference coupler), a semiconductor optical amplifier 104, and an output window 106. In this example, each DFB in the array is excited one at a time. However, in other embodiments, the DFBs can be excited simultaneously, using a modulator coupled to each DFB to, e.g., phase modulate the respective signals. The array may include any number of DFBs. As shown, the laser array can be integrated onto a single chip or other package or substrate.

In one example, the source assembly 90 is coupled to a Fabry-Perot interferometer having a free spectral range (FSR) of 200 GHz or 2000 GHz, and is configured to transmit eight separate beams, each having a different wavelength $\lambda 1$ to $\lambda 8$. The source has 12 nm tunability at 1550 nm, and each laser frequency is locked to an acetylene gas line. This monolithic approach facilitates temperature control (this exemplary laser is temperature stabilized to within 2-3 mK) and has a single temperature/pressure coefficient. The use of a single gas cell yields similar benefits. The temperature/pressure requirement for an acetylene (at 1550 nm) or HF (at 1310 nm) gas cell are much more relaxed, having temperature and pressure ranges of about 200 mK and/or 0.2 psi.

Figure 5:
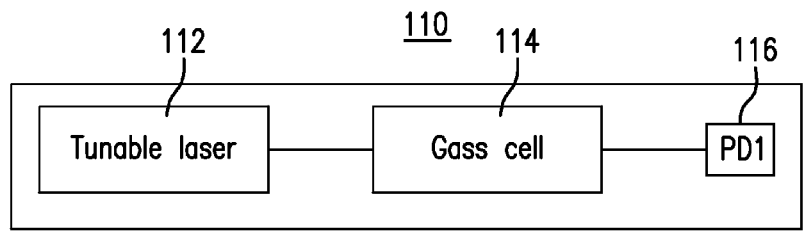
FIG. 5 depicts an exemplary multi-wavelength source including a tunable laser and a gas cell for stabilizing beams emitted by the tunable laser.
Figure 6:
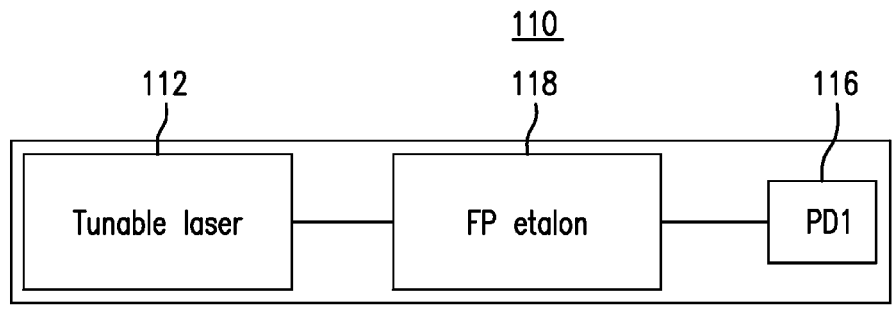
FIG. 6 depicts an exemplary multi-wavelength source including a tunable laser and a reflector assembly for stabilizing beams emitted by the tunable laser.

In one embodiment, the multi-wavelength optical source is a monolithic tunable wavelength source, such as a tunable laser. The tunable laser may be frequency stabilized using a suitable stabilizing assembly. For example, FIG. 5 shows a source assembly 110 that includes a tunable laser 112 coupled to a stabilizing assembly. The stabilizing assembly includes a gas cell 114 and a photodetector 116. It is noted that, for the tunable laser embodiments, the stabilizing assembly only requires one photodetector to lock the emitted laser beam. In another example, shown in FIG. 6, the tunable laser 112 is coupled to reflector assembly such as a Fabry-Perot etalon or interferometer 118.

Figure 7:
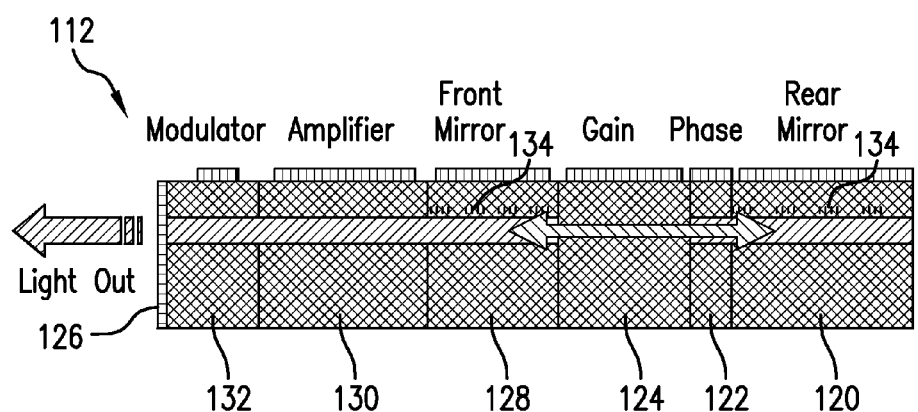
FIG. 7 depicts an exemplary multi-wavelength source including a distributed Bragg reflector (DBR) tunable laser.
Figure 7:
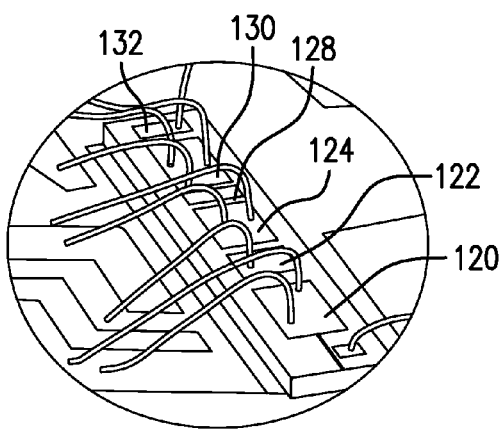

FIG. 7 shows an exemplary tunable laser 112 configured as an integrated distributed Bragg reflector (DBR) laser. The laser 112 includes at least a rear mirror 120, a phase control section 122, a gain section 124 and an emission window 126. DBR lasers typically affect tuning using coarse tuning of mirrors (e.g., compound mirrors or couplers), and fine tuning of the phase section 122. The tunable laser 112 may also include additional components, such as a front mirror 128, an amplifier 130 and/or a modulator 132. Sampled or continuous gratings 134 are used to tune the laser emission wavelength. Such lasers can have extended tuning ranges, e.g., about 32 nm or more. This configuration is useful for its small size, low cost, low power consumption and high reliability, due to features such as the relatively few number of package components and monolithic design.

An example of an 8 beam tunable laser, configured for a Fabry-Perot interferometer with 200 GHz or 2000 GHz FSR, provides at least about 12 nm tunability at 1550 nm. Each laser frequency is locked to an acetylene gas line. The laser can be scanned in milliseconds and then locked to a specific gas line. The wavelength can be coarsely determined such that the error of not knowing the actual spectral line is eliminated. Then the laser can be locked to the desired frequency range (e.g., 20 KHz) using fine current tuning. Phase and/or amplitude modulation can be used to eliminate errors caused by amplitude and/or phase variations, and at the photodetector the phase can be demodulated.

Figure 8:
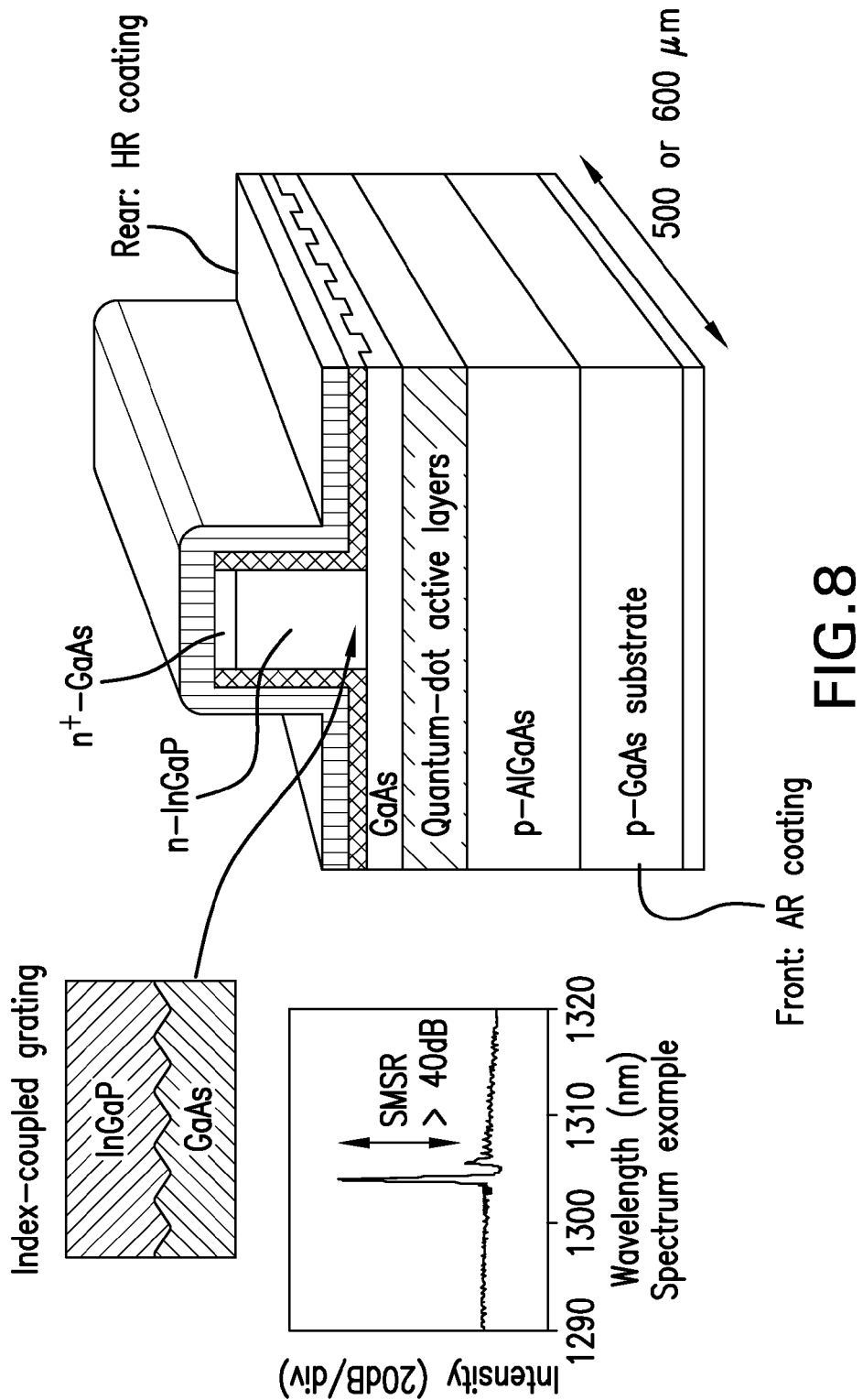
FIG. 8 depicts an example of a quantum dot laser for use in a multi-wavelength source.

In one embodiment, a tunable or array source includes quantum dot laser assemblies. This example is well suited for high temperature (e.g., about 125 degrees C. to 150 degrees C. or above) environments, such as downhole environments. FIG. 8 illustrates an exemplary quantum dot laser.

Figure 9:
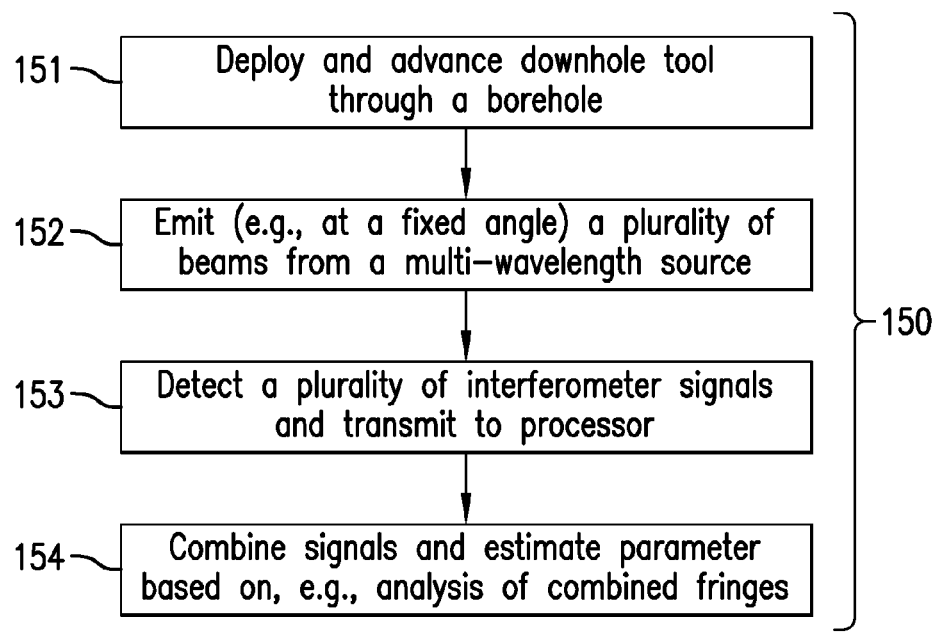
FIG. 9 is a flow diagram depicting an embodiment of a method of performing measurements using optical interferometry.

FIG. 9 illustrates a method 150 for performing measurements using optical interferometry, such as acceleration and gravitational measurements. The method 150 includes one or more stages 151-154. The method 150 is described herein in conjunction with the system 10 and/or the displacement sensor 70, although the method 150 may be performed in conjunction with any number and configuration of measurement devices configured to perform measurements using interferometers as described herein. In one embodiment, the method 150 includes the execution of all of stages 151-154 in the order described. However, certain stages may be omitted, stages may be added, or the order of the stages changed.

In the first stage 151, at least one measurement tool is deployed at a measurement location. In one embodiment, the tool is disposed in a borehole and advanced through the borehole via a wireline or other carrier. Although the stages described herein are described in the context of a downhole gravitational survey, they are not so limited. The method 150 can be applied to surface measurements. In addition, the method 150 may be used to measure other parameters or formation properties, such as acoustic or seismic properties, displacement or deformation of downhole components, vibration and pressure.

The measurement tool includes a sensor or sensing assembly such as the displacement sensor 70. A multi-wavelength electromagnetic radiation source is used to apply optical signals to an interferometer having a reference reflector and a moveable reflector in the sensor. Exemplary multi-wavelength sources include emitter arrays and tunable lasers.

In the second stage 152, multiple optical signals (also referred to as beams) are directed to from the multi-wavelength source to the interferometer, and partially transmitted to a detector array. Each beam has a different wavelength and may be locked to a gas line or other frequency stabilizer. Displacements in the sensor cause the cavity length of the interferometer to change, which alters the detected beam properties. The beams may be emitted at different times (e.g., sequentially) or emitted simultaneously. If the beams are emitted simultaneously, each beam may be modulated using a different modulation pattern or shift.

Figure 10:
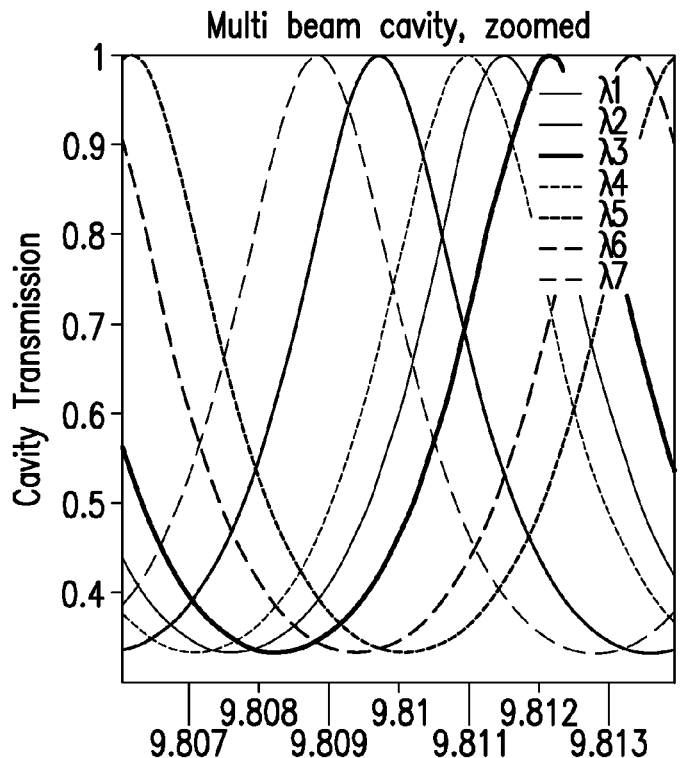
FIG. 10 depicts an exemplary interferometer signals generated using the method of FIG. 9.

In the third stage 153, detected signals or interference patterns are transmitted to a processing device for analysis. An example of detected signals generated by multiple beams is shown in FIG. 10. Each signal may be acquired separately or demodulated to allow for acquisition of multiple signals simultaneously.

In the fourth stage 154, the detected signals are combined to generate a high resolution parameter value. For example, distances between fringes in each signal are estimated and correlated to a change in the cavity length. In one embodiment, the signals detected from the multiple wavelength beams are combined, e.g., using a linear combination, to facilitate counting and identification of the fringes. The change in the cavity length is further associated with a parameter value or parameter change, such as a change in acceleration.

The systems and methods described herein provide various advantages over existing processing methods and devices. For example, interferometer assemblies described herein provide gravitational and other measurements having sufficient range and sensitivity without requiring complex configurations (e.g., multi-beam angles) or costly and technically challenging optical sources (e.g., femtosecond lasers). In addition, the monolithic laser sources described herein, as well as the relatively simple design, allow for much smaller interferometer devices than those using other techniques.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a parameter, comprising:
a multi-wavelength electromagnetic source configured to emit electromagnetic radiation beams having multiple wavelengths at a fixed angle relative to an interferometer, the multi-wavelength source having a stabilizer configured to lock each beam to one of a plurality of discrete wavelength ranges;
the interferometer including a fixed reference reflector and a moveable reflecting surface coupled to a moveable mass, the moveable reflecting surface facing the fixed reference reflector, the mass configured to move in response to the parameter, the multi-wavelength source configured to emit a plurality of beams at the same fixed angle relative to the interferometer, each of the plurality of beams having a different wavelength;
a detector configured to detect an interference pattern generated by the interferometer for each beam, the interference pattern resulting from reflections of a beam between the fixed reference reflector and the movable reflecting surface; and a processor configured to combine the interference patterns and estimate the parameter based on the combined interference pattern.

2. The apparatus of claim 1, wherein the multi-wavelength source is a monolithically integrated laser assembly.

3. The apparatus of claim 2, wherein the multi-wavelength source includes an array of emitters, each emitter configured to emit a beam having a single wavelength or wavelength range.

4. The apparatus of claim 2, wherein the multi-wavelength source includes a quantum dot laser emitter.

5. The apparatus of claim 1, wherein the interferometer includes an etalon formed by the fixed reference reflector and the moveable reflecting surface.

6. The apparatus of claim 1, wherein the stabilizer includes at least one gas line configured to lock an emitted beam to a selected wavelength range.

7. The apparatus of claim 1, wherein the processor is configured to linearly combine the interference patterns and identify fringes based on the combined interference pattern.

8. The apparatus of claim 1, wherein the optical source, the interferometer and the detector are monolithically integrated in a single package.

9. The apparatus of claim 1, wherein the multi-wavelength source is configured to emit each beam simultaneously, and the multi-wavelength source includes a modulator configured to modulate each beam according to a different modulation pattern.

10. The apparatus of claim 1, wherein the multi-wavelength source, the interferometer and the detector are incorporated in a carrier configured to be disposed in a borehole in an earth formation.

11. A method of estimating a parameter, comprising:
emitting a plurality of electromagnetic radiation beams from a multi-wavelength electromagnetic source at a fixed angle relative to an interferometer, each beam having a different wavelength and emitted at the same fixed angle relative to the interferometer,
stabilizing each beam to a discrete wavelength range;
directing each beam to the interferometer, the interferometer including a fixed reference reflector and a moveable reflecting assembly coupled to a moveable mass, the moveable reflecting surface facing the fixed reference reflector, the mass configured to move in response to the parameter;
detecting an interference pattern generated by the interferometer for each beam, the interference pattern resulting from reflections of a beam between the fixed reference reflector and the movable reflecting surface; and
combining the interference patterns by a processor and estimating the parameter based on the combined interference pattern.

12. The method of claim 11, wherein the multi-wavelength source is a monolithically integrated laser assembly.

13. The method of claim 12, wherein the multi-wavelength source includes an array of emitters, each emitter configured to emit a beam having a single wavelength or wavelength range.

14. The method of claim 12, wherein the multi-wavelength source includes a tunable laser.

15. The method of claim 12, wherein the multi-wavelength source includes a quantum dot laser emitter.

16. The method of claim 11, wherein each electromagnetic beam is stabilized by at least one gas line configured to lock the beam to a selected wavelength range.

17. The method of claim 11, wherein combining includes linearly combining the interference patterns and identifying fringes based on the combined interference pattern.

18. The method of claim 11, wherein the optical source, the interferometer and the detector are monolithically integrated in a single package.

19. The method of claim 11, wherein the multi-wavelength source is configured to emit each beam simultaneously, and the multi-wavelength source includes a modulator configured to modulate each beam according to a different modulation pattern.

20. The method of claim 11, further comprising disposing the multi-wavelength source, the interferometer and the detector in a borehole in an earth formation.

* * * * *